United States Patent
Eichner et al.

(10) Patent No.: US 12,151,191 B2
(45) Date of Patent: Nov. 26, 2024

(54) METHOD AND CONTROL UNIT FOR REGENERATING A BRAKE DUST FILTER

(71) Applicant: Bayerische Motoren Werke Aktiengesellschaft, Munich (DE)

(72) Inventors: Georg Eichner, Ismaning (DE); Bernhard Kohl, Munich (DE); Katharina Kolbeck, Munich (DE); Rasmus Leicht, Eching (DE); Diana Westerteicher, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 857 days.

(21) Appl. No.: 17/053,709

(22) PCT Filed: Apr. 29, 2019

(86) PCT No.: PCT/EP2019/060970
§ 371 (c)(1),
(2) Date: Nov. 6, 2020

(87) PCT Pub. No.: WO2019/214986
PCT Pub. Date: Nov. 14, 2019

(65) Prior Publication Data
US 2021/0362085 A1    Nov. 25, 2021

(30) Foreign Application Priority Data
May 9, 2018 (DE) .................. 10 2018 207 303.1

(51) Int. Cl.
*B01D 46/69* (2022.01)
*B01D 46/00* (2022.01)
(Continued)

(52) U.S. Cl.
CPC ......... *B01D 46/69* (2022.01); *B01D 46/0086* (2013.01); *B60T 17/002* (2013.01);
(Continued)

(58) Field of Classification Search
CPC .... B01D 46/69; B01D 46/0086; B01D 46/10; B01D 2279/40; B60T 17/002;
(Continued)

(56) References Cited

U.S. PATENT DOCUMENTS 5,162,053 A * 11/1992 Kowalski, Jr. .......... B08B 17/00
55/467
8,191,691 B2 * 6/2012 Gelb .................... F16D 65/0031
188/71.6
(Continued)

FOREIGN PATENT DOCUMENTS

CN           1879937 A       12/2006
CN         201618518 U       11/2010
(Continued)

OTHER PUBLICATIONS

Epo translation of FR3070872 (Year: 2019).*
(Continued)

*Primary Examiner* — Stephen Hobson
(74) *Attorney, Agent, or Firm* — Crowell & Moring LLP

(57) ABSTRACT

A filter device collects and stores brake particles generated by a friction brake. The filter device can be regenerated. The filter device determines that at least one boundary condition that makes it possible and/or permits the execution of regeneration of the filter device is met. In response to the determination, brake particles stored in the filter device are to be removed from the filter device.

7 Claims, 2 Drawing Sheets

(51) Int. Cl.
*B60T 17/00* (2006.01)
*B60T 17/22* (2006.01)
*F16D 65/00* (2006.01)
  B01D 46/10 (2006.01)
  F16D 55/22 (2006.01)
  F16D 65/78 (2006.01)
  F16D 65/847 (2006.01)
(52) U.S. Cl.
   CPC ........ *B60T 17/221* (2013.01); *F16D 65/0031* (2013.01); *B01D 46/10* (2013.01); *B01D 2279/40* (2013.01); *F16D 55/22* (2013.01); *F16D 2065/783* (2013.01); *F16D 65/847* (2013.01)
(58) Field of Classification Search
   CPC .... B60T 17/221; F16D 65/0031; F16D 55/22; F16D 65/847; F16D 2065/783
   See application file for complete search history.

(56) References Cited

U.S. PATENT DOCUMENTS

| | | | | |
|---|---|---|---|---|
| 2002/0166311 | A1* | 11/2002 | Maricq | B03C 1/23 55/385.3 |
| 2004/0242144 | A1* | 12/2004 | Burn | B01D 53/26 454/156 |
| 2006/0123743 | A1* | 6/2006 | Heer | B01D 53/266 55/309 |
| 2006/0230729 | A1* | 10/2006 | Tabrizi | E01H 1/0836 55/385.3 |
| 2008/0029357 | A1* | 2/2008 | Krantz | B60L 15/2036 219/202 |
| 2010/0065387 | A1* | 3/2010 | Tsiberidis | F16D 65/0031 188/218 A |
| 2010/0116601 | A1* | 5/2010 | Andrews | B60T 17/08 188/153 R |
| 2011/0214568 | A1* | 9/2011 | Krantz | F16D 65/0031 55/385.3 |
| 2013/0105252 | A1* | 5/2013 | Pahle | F16D 65/0031 188/71.1 |
| 2014/0262633 | A1* | 9/2014 | Kunzler | B03C 3/41 188/73.31 |
| 2015/0134217 | A1* | 5/2015 | Drewes | B60T 8/172 701/70 |
| 2015/0233436 | A1* | 8/2015 | Rocca-Serra | F16D 55/225 188/264 R |
| 2016/0280160 | A1* | 9/2016 | MacNeille | G01C 21/3461 |
| 2016/0318419 | A1* | 11/2016 | Gavling | B60L 50/16 |
| 2017/0066042 | A1* | 3/2017 | Woodley | B60T 7/042 |
| 2017/0248180 | A1* | 8/2017 | Metayer | F16D 55/22 |
| 2017/0274916 | A1* | 9/2017 | Nock | B60T 17/20 |
| 2019/0136921 | A1* | 5/2019 | Prouzet | F16D 65/0081 |
| 2020/0063809 | A1* | 2/2020 | Cyrot | B60B 27/0015 |
| 2020/0355230 | A1* | 11/2020 | Arnault | B01D 46/0002 |
| 2021/0316710 | A1* | 10/2021 | Alemani | H04W 4/40 |
| 2021/0362085 | A1* | 11/2021 | Eichner | F16D 65/0031 |
| 2022/0234727 | A1* | 7/2022 | Klim | F16D 65/0031 |
| 2023/0304555 | A1* | 9/2023 | Nagata | B60T 17/22 |
| 2024/0125660 | A1* | 4/2024 | Liu | G01L 5/13 |

FOREIGN PATENT DOCUMENTS

| | | | | |
|---|---|---|---|---|
| CN | 102477885 | A | | 5/2012 |
| CN | 104769309 | A | | 7/2015 |
| CN | 105148627 | A * | 12/2015 | ............... B60S 1/68 |
| CN | 107117141 | A | | 9/2017 |
| CN | 206522173 | U | | 9/2017 |
| CN | 114867417 | A * | 8/2022 | ........... A61B 8/4444 |
| CN | 115003296 | A * | 9/2022 | ........ A61K 31/5025 |
| DE | 203 08 576 | U1 | | 12/2003 |
| DE | 103 36 984 | A1 | | 3/2005 |
| DE | 602 19 028 | T2 | | 12/2007 |
| DE | 20 2006 016 661 | U1 | | 4/2008 |
| DE | 10 2010 024 944 | A1 | | 11/2011 |
| EP | 2 127 727 | A1 | | 12/2009 |
| EP | 2 084 423 | B1 | | 7/2010 |
| EP | 2 492 118 | A2 | | 8/2012 |
| FR | 2 815 099 | A1 | | 4/2002 |
| FR | 3 036 351 | A1 | | 11/2016 |
| FR | 3070872 | A1 * | 3/2019 | ............. B01D 45/18 |
| FR | 3071574 | A1 * | 3/2019 | ........ F16D 65/0031 |
| FR | 3073157 | A1 * | 5/2019 | ........ B01D 46/0002 |
| FR | 3082577 | A1 * | 12/2019 | ........ F16D 65/0031 |
| FR | 3091912 | A1 * | 7/2020 | ............. F16D 55/22 |
| WO | WO 2012/095273 | A1 | | 7/2012 |
| WO | WO-2020058596 | A1 * | 3/2020 | ........ F16D 65/0031 |
| WO | WO-2021048370 | A1 * | 3/2021 | |

OTHER PUBLICATIONS

"Open Roads Forum" published Dec. 2013 accessed at <https://www.rv.net/forums/index.cfm/fuseaction/thread/tid/27396242/print/true.cfm> (Year: 2013).*
"Global Positioning System" Wikipedia published Sep. 21, 2016 accessed at < https://en.wikipedia.org/w/index.php?title=Global_Positioning_System&oldid=740568972> (Year: 2016).*
Chinese-language Office Action issued in Chinese Application No. 201980028210.2 dated Jan. 29, 2022 with English translation (17 pages).
Chinese-language Office Action issued in Chinese Application No. 201980028210.2 dated Jun. 21, 2022 with English translation (19 pages).
International Search Report (PCT/ISA/210) issued in PCT Application No. PCT/EP2019/060970 dated Jul. 17, 2019 with English translation (seven (7) pages).
German-language Written Opinion (PCT/ISA/237) issued in PCT Application No. PCT/EP2019/060970 dated Jul. 17, 2019 (six (6) pages).
German-language Search Report issued in German Application No. 10 2018 207 303.1 dated May 6, 2019 with partial English translation (15 pages).

* cited by examiner

METHOD AND CONTROL UNIT FOR REGENERATING A BRAKE DUST FILTER

BACKGROUND AND SUMMARY OF THE INVENTION

The present subject matter relates to a method and to a corresponding control unit for the regeneration of a brake dust filter.

A vehicle, for example a road motor vehicle, typically comprises one or more friction brakes, by way of which the vehicle can be slowed down. A friction brake usually has a brake caliper which is set up to press brake linings onto a brake disk, with the result that slowing down of the vehicle is brought about by way of the friction between the brake linings and the brake disk.

In the case of the friction between brake linings and the brake disk, brake particles are typically produced which can pass into the surrounding air of a friction brake and can thus, depending on the particle size, contribute to the particulate emissions of a vehicle.

A vehicle can have one or more filters which are set up to at least partially collect the brake particles which are brought about by way of the friction of a friction brake, in order to reduce the particulate emissions of the vehicle. The one or more filters can become increasingly clogged during operation as a result of the collected brake particles, with the result that the efficacy of the one or more filters drops.

The present subject matter is concerned with the technical object of ensuring a permanently high effectiveness of the one or more brake dust filters of a friction brake in an efficient way.

The object is achieved by way of the independent claims. Advantageous embodiments will be described, inter alia, in the dependent claims. It is noted that additional features of a patent claim which is dependent on an independent patent claim can form, without the features of the independent patent claim or only in combination with a part quantity of the features of the independent patent claim, their own invention which is independent of the combination of all the features of the independent patent claim, and can be made the subject matter of an independent claim, a divisional application or a subsequent application. This applies in the same way to technical teachings which are described in the description and can form an invention which is independent of the features of the independent patent claims.

In accordance with one aspect, a method for the regeneration of filter apparatus is described, the filter apparatus being set up to collect and to store brake particles which are produced by a friction brake. For example, the filter apparatus can have a filter which is set up to filter brake particles (for example, respirable brake particles) from an air flow which comes from the friction brake. Furthermore, the filter apparatus can comprise a filter chamber or a collecting vessel for receiving the brake particles which have been filtered out. Within the context of the regeneration, the brake particles which are stored in the filter apparatus can be removed at least partially from the filter apparatus, for example from the collecting vessel, in order to increase the efficacy of the filter apparatus and/or in order to make further operation of the filter apparatus possible.

The method comprises determining that there is at least one boundary condition which makes it possible and/or permissible to carry out a regeneration of the filter apparatus. Here, the at least one boundary condition can comprise, for example, a condition in relation to a current position of the filter apparatus. For example, the at least one boundary condition can comprise a condition to the extent that the filter apparatus is situated at a position, at which an emissions quantity of brake particles which is increased with respect to another position is permissible and/or possible. As an alternative or in addition, the at least one boundary condition can comprise a condition to the extent that the filter apparatus is situated at a position which is suitable and/or provided for the removal of brake particles from the filter apparatus. For example, the at least one boundary condition can comprise a condition to the extent that the filter apparatus is situated in a car wash and/or in a maintenance center.

As an alternative or in addition, the at least one boundary condition can be dependent on the moisture in the (direct) surrounding area of the filter apparatus. For example, the at least one boundary condition can comprise a condition to the extent that the (direct) surrounding area of the filter apparatus has a sufficiently high degree of moisture, or exceeds a threshold level of moisture, for receiving brake particles from the filter apparatus. As an alternative or in addition, the at least one boundary condition can comprise a condition to the extent that it is raining in the (direct) surrounding area of the filter apparatus, for example with a precipitation quantity which reaches or exceeds a predefined precipitation threshold value.

The presence of the at least one boundary condition can ensure that impermissibly high particulate pollution is not brought about by way of the removal of brake particles from the filter apparatus. It can therefore be determined that a regeneration of the filter apparatus is permissible and/or possible on the basis of the position and/or the environmental conditions of the filter apparatus.

Moreover, the method comprises, as a reaction to the fact that it has been determined that there is at least one boundary condition which makes it possible and/or permissible to carry out a regeneration of the filter apparatus, causing brake particles which are stored in the filter apparatus to be removed from the filter apparatus. For example, it can be caused that the collecting vessel is opened, in order to at least partially empty the collecting vessel, and/or that a flushing flow consisting of a flushing medium (for example, air or water) through the collecting vessel is brought about, in order to flush brake particles from the collecting vessel, and/or that a defined point is driven to, at which the collecting vessel can be emptied (for example, by a corresponding request being output to the driver of the vehicle).

By way of the method, in the case of the presence of at least one boundary condition, a regeneration of a filter apparatus for receiving brake particles can be brought about automatically. The maintenance complexity for the filter apparatus can thus be reduced. Furthermore, the required storage volume of a collecting vessel and therefore the required installation space for a storage apparatus can thus be reduced. For example, a permanently high degree of efficiency of a filter apparatus can thus be made possible in an efficient way.

The filter apparatus can therefore be operated (at least temporarily) in a regeneration mode when it has been determined that there is at least one boundary condition which makes it possible and/or permissible to carry out a regeneration of the filter apparatus. Furthermore, the method can comprise determining that there is no boundary condition which makes it possible and/or permissible to carry out a regeneration of the filter apparatus. As a reaction thereto, the filter apparatus can be operated in an operating mode, in the case of which receiving and storing of brake particles take place. For example, the filter apparatus can be operated in the operating mode for reducing the emissions quantity of brake particles when the filter apparatus is situated at a position with high restrictions in relation to the particulate emissions, and/or when the surrounding area of the filter apparatus has a low degree of moisture or is less than a threshold level of moisture. A reliable reduction of the particulate emissions of a friction brake can thus be brought about.

In accordance with a further aspect, a control unit is described for controlling the operation of a filter apparatus which is set up to collect and to store brake particles which are produced by a friction brake. The control unit is set up to determine that there is at least one boundary condition which makes it possible and/or permissible to carry out a regeneration of the filter apparatus. For example, the control unit can be set up to determine position data in relation to a position of the filter apparatus. Here, the position data can be determined, for example, using a position sensor, such as a GPS receiver. It can then be determined on the basis of the position data whether there is the at least one boundary condition or not.

Furthermore, the control unit is set up, as a reaction to the fact that it has been determined that there is at least one boundary condition which makes it possible and/or permissible to carry out a regeneration of the filter apparatus, to cause brake particles which are stored in the filter apparatus to be removed from the filter apparatus (for example, by way of opening of an opening of a collecting vessel of the filter apparatus).

In accordance with a further aspect, a friction brake (for example, for a wheel of a vehicle) is described. The friction brake comprises a brake disk and a brake caliper which encloses the brake disk at least partially. Furthermore, the friction brake comprises a filter apparatus which is set up to filter brake particles from an air flow which comes from the brake disk and/or the brake caliper. Moreover, the friction brake comprises a control unit which is described in this document. The control unit is set up to operate the filter apparatus (depending on the presence of one or more boundary conditions) in an operating mode, in which receiving and storing of brake particles take place, or to operate it in a regeneration mode, in which brake particles which are stored in the filter apparatus are removed from the filter apparatus.

In accordance with a further aspect, a road motor vehicle (for example, a passenger motor car or a truck or a bus or a motorcycle) is described which comprises the control unit which is described in this document and/or the friction brake which is described in this document.

In accordance with a further aspect, a software (SW) program comprising instructions stored on a non-transitory computer-readable medium is described. The SW program can be set up to be run on a processor (for example, on a control unit of a vehicle), and in order, as a result, to carry out the method which is described in this document by executing the computer-readable instructions via the processor.

In accordance with a further aspect, a storage medium is described. The storage medium can comprise an SW program which is set up to be run on a processor, and in order, as a result, to carry out the method which is described in this document.

It is to be noted that the methods, apparatuses and systems which are described in this document can be used both on their own and also in combination with other methods, apparatuses and systems which are described in this document. Furthermore, any aspects of the methods, apparatuses and systems which are described in this document can be combined with one another in a variety of ways. For example, the features of the claims can be combined with one another in a variety of ways.

In the further text, the present subject matter will be described in greater detail on the basis of example embodiments. In the drawings:

DETAILED DESCRIPTION OF THE DRAWINGS

Figure 1A:
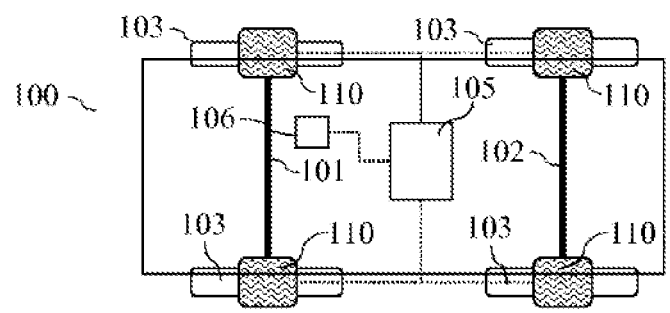
FIG. 1a shows an example vehicle with a plurality of friction brakes.

As stated at the outset, the present subject matter is concerned with the efficient maintenance of the degree of efficiency of a filter apparatus for filtering brake particles. In this context, FIG. 1a shows a vehicle 100 with a front axle 101 and a rear axle 102, the axles 101, 102 in each case having two wheels 103 with in each case one friction brake 110. By way of a friction brake 110, a brake torque can be brought about on the wheel 103 of the vehicle 100, and therefore slowing down of the vehicle 100 can be brought about. The friction brakes 110 of the vehicle 100 can be actuated mechanically (for example, hydraulically) and/or electrically by way of actuation of a brake pedal and/or a brake lever of the vehicle 100. FIG. 1a shows by way of example a control unit 105 for the actuation of the friction brakes 110. As an alternative or in addition, the control unit 105 can be set up to actuate one or more filter apparatuses of the friction brakes 110.

Figure 1B:
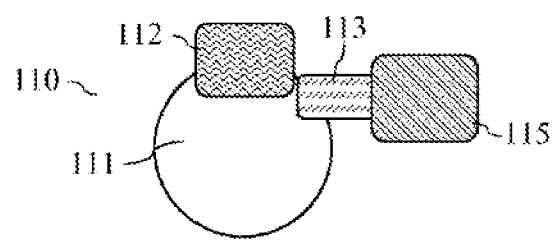
FIG. 1b shows an example friction brake with a filter apparatus.

FIG. 1b shows an example construction of a friction brake 110. The friction brake 110 comprises a brake disk 111 and a brake caliper 112. Here, the brake caliper 112 is configured to press brake linings from both sides against the brake disk 111, in order to bring about a brake torque on the brake disk 111 and the wheel 103 which is connected fixedly to the latter. When the brake linings are pressed against the brake disk 111, abrasion of the brake linings and/or the brake disk 111 typically occurs in the form of brake particles of greater or smaller size.

In order to avoid that, for example, relatively small, respirable brake particles pass into the environment and therefore lead to particulate emissions of a vehicle 100, a friction brake 110 can have a filter apparatus 115 which is set up to separate brake dust which accrues or brake particles which accrue. Here, the brake particles can be sucked via an intake duct 113 away from the brake caliper 112 and/or the brake disk 111 to the filter apparatus 115. As an alternative or in addition, the filter apparatus 115 can enclose the brake disk 111 and/or the brake caliper 112 at least partially.

Figure 2A:
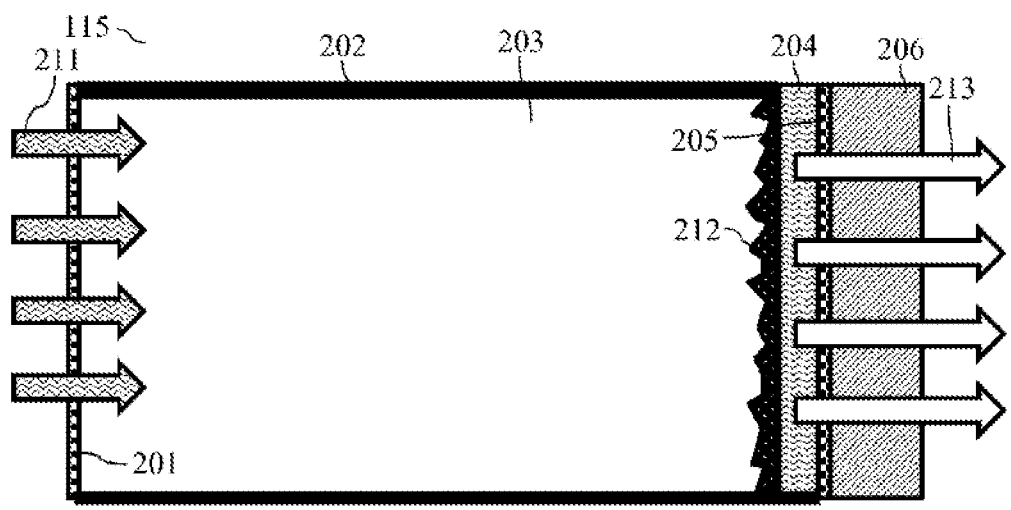
FIG. 2a shows an example filter apparatus in an operating state or in an operating mode.

FIG. 2a shows an example filter apparatus 115 with a (particulate) filter 204. An air flow 211 can be brought about by way of a vacuum means 206 (for example, by way of a turbine), which air flow 211 is configured to suck brake particles which are produced by a friction brake 110 into the filter apparatus 115. For example, the air flow 211 can be sucked through a closable front wall 201 into the filter apparatus 115. The closable front wall 201 can be configured to enable an air flow 211 from the outside into the filter apparatus 115 (shown in FIG. 2a by way of the arrows). Secondly, the closable front wall 201 can be configured to prevent an air flow 211 in the opposite direction (out of the filter apparatus 115). For this purpose, for example, the front wall 201 can be configured as a check valve.

The air flow 211 which is brought about by way of the vacuum means 206 can be sucked through the filter 204, with the result that brake particles 212 are separated on the surface of the filter 204. The filtered air flow 213 which exits from the filter apparatus 115 therefore has a reduced quantity of brake particles 212 in comparison with the air flow 211. The brake particles 212 which have been filtered out can be collected in a filter chamber 203 (also called a collecting vessel in this document) which is formed by way of the front wall 211, by way of a side wall 202 and by way of the filter 204.

Furthermore, the filter apparatus 115 can have a closable rear wall 205. The closable rear wall 205 can be configured to enable an air flow 213 out of the filter apparatus 115 (shown in FIG. 2a by way of the arrows). Secondly, the closable rear wall 205 can be configured to prevent an air flow 213 in the opposite direction (into the filter apparatus 115). For this purpose, for example, the rear wall 205 can be configured as a check valve.

FIG. 2a shows the filter apparatus 115 in an operating state or in an operating mode, in the case of which an air flow 211 is sucked from a friction brake 110 through the filter apparatus 115, in order to filter brake particles 212 from the air flow 211. In the operating state, both the front wall 201 and the rear wall 205 are open, in order to enable the air flow 211 through the filter 204.

During operation, more and more brake particles 212 are deposited on the surface of the filter 204, as a result of which the efficacy of the filter 204 is gradually reduced. As an alternative or in addition, the pressure in the filter apparatus 115 can rise, which can lead to problems in the case of the operation of the filter apparatus 115. In order to increase the efficacy of the filter 204 and/or in order to avoid pressure problems, the brake particles 212 can be removed from the surface of the filter 204 and/or from the filter chamber 203.

Figure 2B:
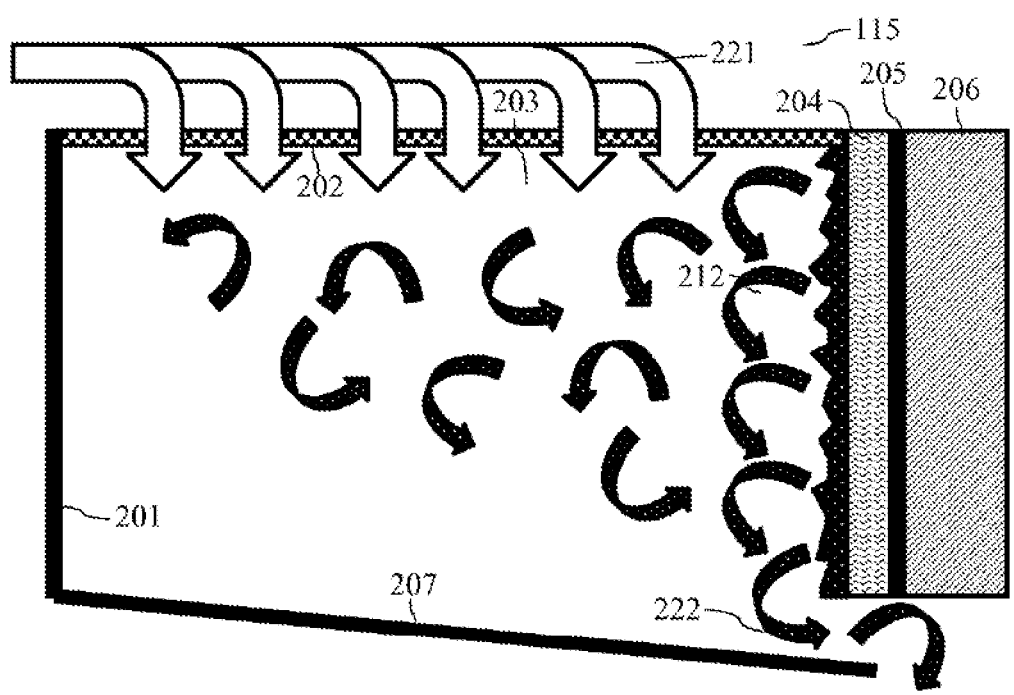
FIG. 2b shows an example filter apparatus in a regeneration state or in a regeneration mode.

FIG. 2b shows the filter apparatus 115 in a regeneration state or a regeneration mode which makes it possible to remove brake particles 212 from the filter chamber 203. For this purpose, the front wall 201 and the rear wall 205 can be closed. Furthermore, the one or more side walls 202 can be opened, in order to conduct a flushing flow 221 (for example, consisting of a liquid or gaseous flushing medium) through the filter chamber 203. For example, a first side wall 202 (for example, the side wall which is shown at the top in FIG. 2b) can be configured as a shut-off valve which can be opened for the regeneration of the filter apparatus 115. A second side wall 202 (for example, the side wall which is shown at the bottom in FIG. 2b) can be configured as a shut-off valve or as a flap 207 which can be opened for the regeneration of the filter apparatus 115.

As shown in FIG. 2b, the flushing flow 221 can be configured to release and/or to entrain the brake particles 212, with the result that a flushing flow 222 which is enriched with brake particles 212 is guided out of the filter chamber 203. In this way, a regeneration or cleaning of the filter 204 can be brought about using a flushing operation.

The vehicle 100 can comprise a position sensor 106 which is set up to determine position data in relation to the current position of the vehicle 100. The control unit 105 can be set up to determine on the basis of the position data whether the vehicle 100 is situated at a position which is suitable and/or permissible for the regeneration of the filter apparatus 115. Here, digital map information can be taken into consideration which indicates, for example, whether the current position of the vehicle 100 is a main road, a street in a town, a car wash, a maintenance center for the vehicle 100, etc.

The regeneration of the filter apparatus 115 can then be carried out in a manner which is dependent on the current position of the vehicle 100 and/or the filter apparatus 115. For example, a regeneration of the filter apparatus 115 can be carried out only when it has been determined that the filter apparatus 115 and/or the vehicle 100 are/is situated at a position which is suitable and/or permissible for the regeneration of the filter apparatus 115. Otherwise, a regeneration of the filter apparatus 115 can be prevented.

Therefore, a filter apparatus 115 is described which comprises a filter chamber 203, in which brake dust can be collected and stored. The filter apparatus 115 makes automated emptying of the collecting vessel or the filter chamber 203 possible (optionally even during travel of a vehicle 100). Using a position sensor 106 (for example, a GPS sensor), the position of the filter apparatus 115 can be determined. For example, it can be determined on the basis of the position data of a position sensor 106 whether the filter apparatus 115 is situated at a position which is suitable and/or permissible for the regeneration of the filter apparatus 115.

If it is detected that the filter apparatus 115 is situated at a position which is not suitable and/or not permissible for the regeneration of the filter apparatus 115 (for example, in an urban surrounding area), the filter apparatus 115 can be operated in the operating state or in the operating mode, in order to catch brake particles 212 and to collect them in a filter chamber 203. The emissions of brake dust can thus be reduced reliably. Here, the filter chamber 203 or the collecting vessel for brake particles 212 is closed.

If it is detected on the other hand that the filter apparatus 115 is situated at a position which is suitable and/or permissible for the regeneration of the filter apparatus 115 (for example, in a car wash and/or in a maintenance center), the filter apparatus 115 can be set into the regeneration mode, in order to empty the filter chamber 203, and therefore to increase the efficacy of the filter apparatus 115. Here, the emptying operation can take place automatically.

Figure 3:
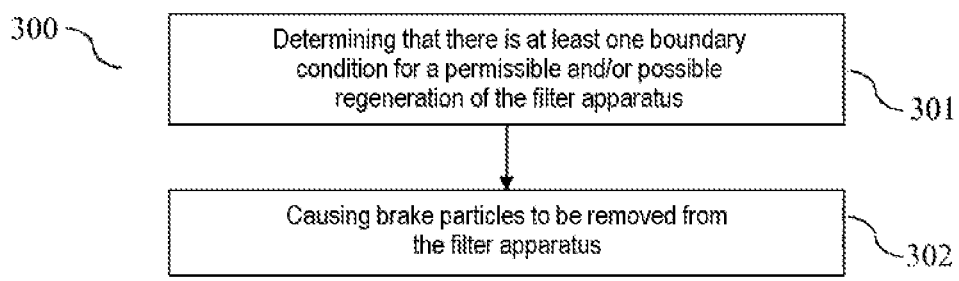
FIG. 3 shows a flow chart of an example method for the regeneration of the filter apparatus for filtering brake particles.

FIG. 3 shows a flow chart of an example method 300 for the regeneration of the filter apparatus 115 which is set up to collect and to store brake particles 212 which are produced by a friction brake 110.

The method 300 comprises determining 301 that there is at least one boundary condition which makes it possible and/or permissible to carry out a regeneration of the filter apparatus 115. The boundary condition can comprise or be a condition in relation to a current position of the filter apparatus 115. For example, the boundary condition can be a condition to the extent that the filter apparatus 115 is situated at a position, at which the regeneration of the filter apparatus 115 is permissible and/or possible (for example, at a position, at which an increased emissions quantity of brake dust is permissible). As an alternative or in addition, the boundary condition can be dependent on the air humidity and/or on precipitation in the direct surrounding area of the filter apparatus 115. For example, the regeneration of the filter apparatus 115 can be permissible and/or possible when there is a sufficiently high precipitation quantity in the direct surrounding area.

Moreover, the method 300 comprises, as a reaction to the fact that it has been determined that there is at least one boundary condition for carrying out the regeneration of the filter apparatus 115, causing 302 that brake particles 212 which are stored in the filter apparatus 115 are removed from the filter apparatus 115 (for example, flushed from the filter apparatus 115).

By way of the measures which are described in this document, the maintenance complexity for a filter apparatus 115 for filtering brake dust can be reduced. Furthermore, the required volume of the collecting vessel or the filter chamber 203 for storing brake particles 212 can be reduced by way of the repeated, automatic regeneration of the filter apparatus 115, with the result that the required installation space can be reduced.

The present subject matter is not restricted to the example embodiments which are shown. For example, it is to be noted that the description and the figures are intended to illustrate merely the principle of the proposed methods, apparatuses, and systems.

What is claimed is:

1. A control unit for controlling operation of a filter apparatus to collect and to store brake particles produced by a friction brake, comprising:
   the control unit, which is configured to execute instructions to cause the filter apparatus to:
      determine at least one boundary condition that makes it possible and/or permissible to carry out a regeneration of the filter apparatus, wherein the at least one boundary condition comprises a threshold of a level of moisture in an area surrounding the filter apparatus; and
      in response to the determining, cause brake particles stored in the filter apparatus to be removed from the filter apparatus.

2. The control unit according to claim 1, further being configured to execute instructions to:
   determine position data in relation to a position of the filter apparatus, wherein
   the determining of the at least one boundary condition further comprises determining, based on the position data, whether at least one boundary condition exists or not.

3. The control unit according to claim 2, wherein the position data is determined by a position sensor.

4. The control unit according to claim 3, wherein the position sensor is a GPS receiver.

5. The control unit of claim 2, wherein the position of the filter apparatus is determined to be at least one of a car wash or a maintenance center.

6. The control unit of claim 1, wherein the threshold of the level of moisture indicates an extent that it is raining in the area surrounding the filter apparatus.

7. A friction brake, comprising:
   a brake disk;
   a brake caliper that encloses the brake disk at least partially;
   a filter apparatus to filter brake particles from an air flow that comes from the brake disk and/or the brake caliper; and
   the control unit according to claim 1, further configured to execute instructions to cause the filter apparatus to:
      operate in an operating mode in which brake particles are received and stored; or
      operate in a regeneration mode in which brake particles stored in the filter apparatus are removed from the filter apparatus.

* * * * *